ай

United States Patent
King

(10) Patent No.: US 10,459,726 B2
(45) Date of Patent: Oct. 29, 2019

(54) SYSTEM AND METHOD FOR STORE FUSION

(71) Applicant: Advanced Micro Devices, Inc., Santa Clara, CA (US)

(72) Inventor: John M. King, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/822,515

(22) Filed: Nov. 27, 2017

(65) Prior Publication Data
US 2019/0163475 A1    May 30, 2019

(51) Int. Cl.
| | | |
|---|---|---|
| *G06F 9/312* | (2018.01) | |
| *G06F 9/46* | (2006.01) | |
| *G06F 12/00* | (2006.01) | |
| *G06F 7/57* | (2006.01) | |
| *G06F 9/30* | (2018.01) | |
| *G06F 9/38* | (2018.01) | |
| *G06F 9/48* | (2006.01) | |
| *G06F 12/0875* | (2016.01) | |
| *G06F 8/41* | (2018.01) | |

(52) U.S. Cl.
CPC .......... *G06F 9/3017* (2013.01); *G06F 7/57* (2013.01); *G06F 9/30047* (2013.01); *G06F 9/30181* (2013.01); *G06F 9/384* (2013.01); *G06F 9/4806* (2013.01); *G06F 12/0875* (2013.01); *G06F 8/443* (2013.01); *G06F 8/48* (2013.01); *G06F 9/30043* (2013.01)

(58) Field of Classification Search
CPC ............... G06F 9/3017; G06F 9/30047; G06F 9/30181; G06F 9/3838; G06F 9/384; G06F 9/4806; G06F 9/30043; G06F 9/3853; G06F 9/3857; G06F 9/45516; G06F 9/45525; G06F 8/48; G06F 8/443; G06F 12/0875; G06F 7/57
USPC ......... 712/203, 213, 226, 219; 717/145, 153, 717/160, 162
See application file for complete search history.

(56) References Cited

U.S. PATENT DOCUMENTS

| | | | | |
|---|---|---|---|---|
| 2003/0194129 | A1* | 10/2003 | Metz .................. | G06K 9/00456 382/173 |
| 2004/0199755 | A1* | 10/2004 | Sperber .............. | G06F 9/30145 712/244 |
| 2006/0123219 | A1* | 6/2006 | Samra ................. | G06F 9/3017 712/217 |
| 2007/0038844 | A1* | 2/2007 | Valentine ............ | G06F 9/3853 712/219 |
| 2010/0070741 | A1 | 3/2010 | Col et al. | |
| 2010/0299505 | A1 | 11/2010 | Uesugi | |

(Continued)

*Primary Examiner* — Daniel H Pan
(74) *Attorney, Agent, or Firm* — Volpe and Koenig, P.C.

(57) ABSTRACT

Described herein is a system and method for store fusion that fuses small store operations into fewer, larger store operations. The system detects that a pair of adjacent operations are consecutive store operations, where the adjacent micro-operations refers to micro-operations flowing through adjacent dispatch slots and the consecutive store micro-operations refers to both of the adjacent micro-operations being store micro-operations. The consecutive store operations are then reviewed to determine if the data sizes are the same and if the store operation addresses are consecutive. The two store operations are then fused together to form one store operation with twice the data size and one store data HI operation.

18 Claims, 5 Drawing Sheets

(56) References Cited

U.S. PATENT DOCUMENTS

2011/0108915 A1    8/2011  Bannon et al.
2012/0144174 A1    6/2012  Talpes et al.
2018/0095761 A1*  4/2018  Winkel ................ G06F 3/0608

* cited by examiner

SYSTEM AND METHOD FOR STORE FUSION

BACKGROUND

A processor generally has associated with it an instruction pipeline which includes fetching, decoding (or dispatching) and executing stages. The decoding stage retrieves an instruction from a fetch queue. If the fetched instruction is a store operation, queue entries are allocated in arithmetic logic unit (ALU) scheduler queues (ALSQs), address generation scheduler queues (AGSQs) and store queues (STQs). Conventional processors perform one store operation per cycle. In an effort to increase the instructions per cycle (IPC), some processors use a two-store commit architecture. This is done at the cost of additional control logic on the die area and increased power usage.

BRIEF DESCRIPTION OF THE DRAWINGS

A more detailed understanding may be had from the following description, given by way of example in conjunction with the accompanying drawings wherein.

DETAILED DESCRIPTION

Processors generally operate pursuant to an instruction pipeline which includes fetching, decoding (or dispatching) and executing stages. The decoding or dispatching stage retrieves an instruction from a fetch queue. If the fetched instruction is a store micro-operation, queue entries are allocated in arithmetic logic unit (ALU) scheduler queues (ALSQs), address generation scheduler queues (AGSQs) and store queues (STQs). Each store micro-operation is performed independently and conventional processors perform one store micro-operation per cycle.

Described herein is a system and method for store fusion that fuses small store micro-operations into fewer, larger store micro-operations. In particular, the system detects that adjacent micro-operations are consecutive store micro-operations. The consecutive store micro-operations are then reviewed to determine if the data sizes are the same and if the store micro-operation addresses are consecutive. The consecutive store micro-operations are fused together to form one store micro-operation with twice the data size and two store data micro-operations, one for each of the two stores, if the above conditions are met. This increases performance by saving STQ and AGSQ queue entries, and saves power by decreasing the number of address generations, store pipe flows and store commits that write to cache, for example. The store fusion system and method effectively realizes much of the IPC gain of a two-store per cycle architecture without the disadvantages of a two-store-commit which include, for example, added complexity, increased power requirement, and added difficulty in achieving higher frequency of operation.

Figure 1:
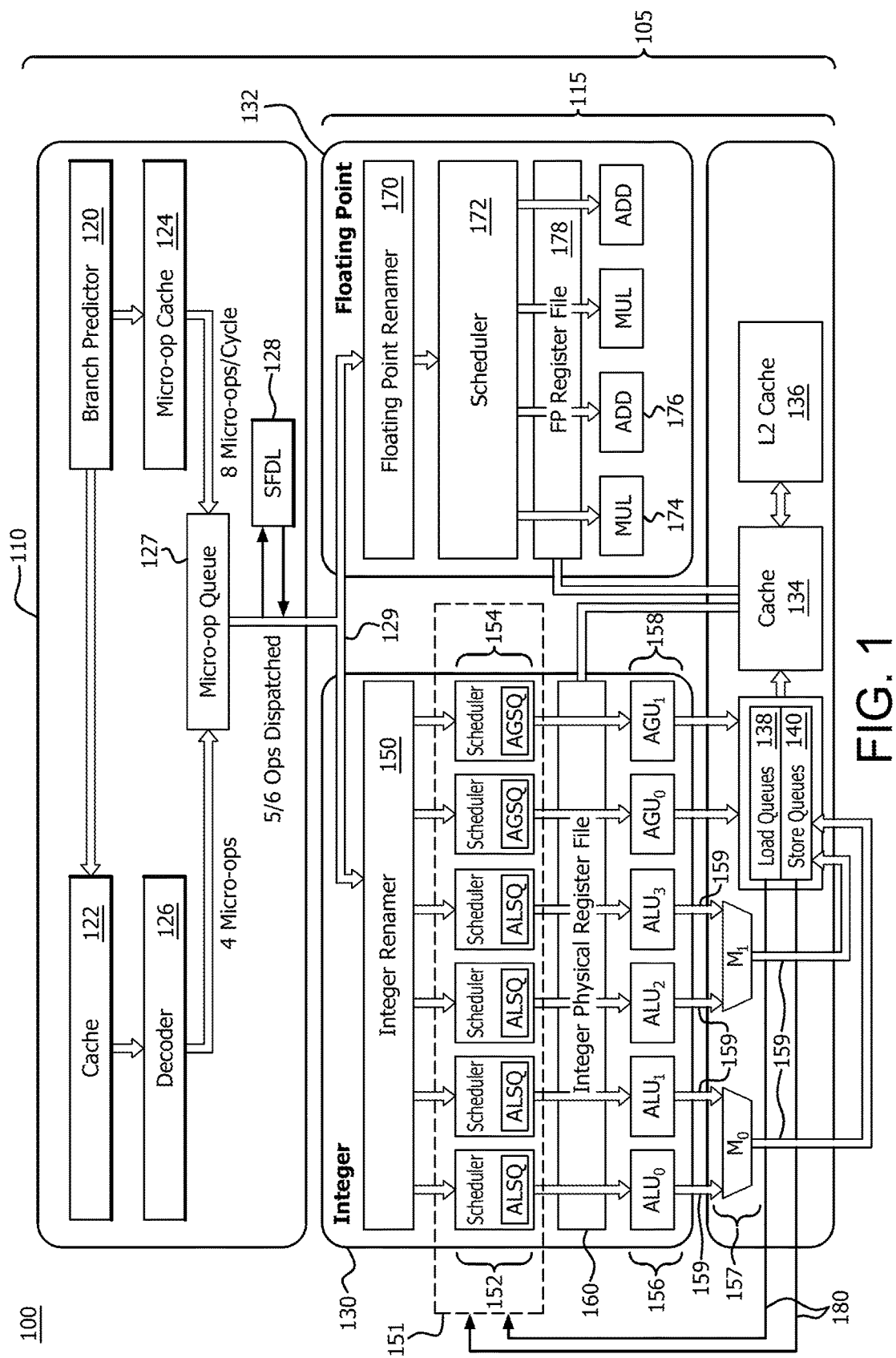
FIG. 1 is a high level block and flow diagram of a core processing unit of a processor in accordance with certain implementations.

FIG. 1 is a high level block and flow diagram of a core processing unit 105 of a processor 100 in accordance with certain implementations. The core processing unit 105 includes a decoder unit 110 which provides micro-operations (shown as micro-ops in FIG. 1) to a scheduler and execution unit (SCEX) 115. The decoder unit 110 includes a branch predictor 120 connected to a cache 122 and a micro-op cache 124. The cache 122 is further connected to a decoder 126. The decoder 126 and the micro-op cache 124 are connected to a micro-op queue 128, which dispatches operations via a dispatch logic 129. A store fusion detection logic (SFDL) 128 is connected to dispatch logic 129.

The SCEX 115 includes an integer SCEX 130 and a floating point SCEX 132, both of which are connected to a cache 134. The cache 134 is further connected to a L2 cache 136, LDQs 138 and STQs 140. The integer SCEX 130 includes an integer renamer 150 which is connected to a scheduler 151, which includes arithmetic logic unit (ALU) scheduler queues (ALSQs) 152 and address generation unit (AGU) scheduler queues (AGSQs) 154. The scheduler 151, and in particular the ALSQs 152 and AGSQs 154, are further connected to $ALU_0$-$ALU_3$ 156 and $AGU_0$-$AGU_1$ 158, respectively. A pair of multiplexers $M_0$ and $M_1$ 157 and a store data interface 159 connects $ALU_0$ and $ALU_1$ to STQs 140 and $ALU_2$ and $ALU_3$ to STQs 140. The LDQs 138 and STQs 140 are connected to the scheduler 151 via path 180 to send deallocation signals. The integer SCEX 130 also includes an integer physical file register 160. The floating point SCEX 132 includes a floating point renamer 170, which is connected to a scheduler 172. The scheduler 172 is further connected to multipliers 174 and adders 176. The floating point SCEX 132 also includes a floating point physical file register 178.

A pipelined processor requires a steady stream of instructions to be fed into the pipeline. The branch predictor 120 predicts which set of micro-operations are fetched and executed in the pipelined processor. These micro-operations are fetched and stored in cache 122, which in turn are decoded by the decoder 126. The micro-op cache 124 caches the micro-operations from the branch predictor 120 as the decoder 126 decodes the micro-operations from the cache 122. The micro-op queue 128 stores and queues up the micro-operations from the decoder 126 and micro-op cache 124 for purposes of dispatching the micro-operations for execution via the dispatch logic 129.

In conventional pipeline architecture, each micro-operation is dispatched and handled independently. This may lead to inefficient processing under certain cases. For example, a store micro-operation includes three components: a load/store operation that is directed to a store queue; an address generation operation that is directed to a AGSQ; and a store data operation that is directed to a ALSQ. Each store micro-operation therefore uses three queue entries and associated processing to complete the store micro-operation.

In accordance with an implementation, the SFDL 128 determines whether adjacent micro-operations are consecutive store micro-operations. The SFDL 128 also confirms whether the consecutive store micro-operations have the same data size and are accessing consecutive addresses. In an implementation, the SFDL 128 checks the addressing mode of each of the store micro-operations. For example for a 4 byte store micro-operation, an addressing mode of the first store micro-operation may use a base register R with a displacement of +4 and an addressing mode of the second store micro-operation may use a base register R with a displacement of +8. In this case, the addresses for the first store micro-operation and the second store micro-operation would be consecutive. That is, the same registers are being used with consecutive constants or offsets for the displacement. In an implementation, the displacement can be positive or negative.

In the event that the store micro-operations have the same data sizes and use consecutive addresses, the SFDL 128 fuses the consecutive store micro-operations into one store micro-operation with two times the data size. In particular, the store micro-operation with the lower address is converted from a store micro-operation with data size x to a store micro-operation with data size 2x and the store micro-operation with the higher address is converted from a store micro-operation with data size x to a store data HI micro-operation where the load/store micro-operation and address generation micro-operation components are suppressed. That is, the store data HI micro-operation only uses a queue entry in the ALSQ 152. Queue entries in the STQ 140 and AGSQ 154 are not needed as store fusion leverages the greater STQ bandwidth that is available for larger data size store micro-operations in the store micro-operation with data size 2x.

In order to maintain age-ordered operation or in-order queues, every store micro-operation is associated with a particular store queue entry or store queue identifier. That store queue entry is assigned to the store micro-operation at dispatch in program order (e.g., a store micro-operation might be assigned to store queue entry 0, and the next store micro-operation in the program order would be assigned to store queue entry 1, the next store micro-operation in the program order would be assigned to store queue entry 2, and so on). The SFDL 128 uses this information to set the same store queue entry number in both the store micro-operation with data size 2x and the store data HI micro-operation. In addition, the SFDL 128 and dispatch logic 129 sets the micro-operation type in the store data HI micro-operation to indicate that this data is the high part of the store micro-operation with data size 2x. The $ALU_0$-$ALU_3$ 156 uses the micro-operation type to understand what needs to be done with the data in the store data HI micro-operation.

Once the SFDL 128 has fused the consecutive store micro-operations as described herein, the dispatch logic 129 dispatches the store micro-operation with data size 2x and the store data HI micro-operation to the ALSQs 152 and AGSQs 154, as appropriate. The ALSQs 152 and AGSQs 154 issue the store micro-operation with data size 2x and the store data HI micro-operation to $ALU_0$-$ALU_3$ 156, as appropriate. The $ALU_0$-$ALU_3$ 156 sends a control bit(s) via the store fusion control interface 159 to the STQs 140 to indicate that the data in the store data HI micro-operation is to be written in the higher or upper part of the store data field. That is, the control bit(s) indicates that the data in the store data HI micro-operation needs to be shifted when stored. The data in the store micro-operation with data size 2x is written in the lower part of the store data field. The STQs 140 perform the required writes. In an implementation, a store load forward operation can be executed once both the store micro-operation with data size 2x and the store data HI micro-operation have delivered their data.

In an illustrative example, consider the following two instructions:
MOV [RBX+8], R8 (64b datasize)
MOV [RBX+16], R9 (64b datasize)

In a conventional architecture, the above two instructions become two store micro-operations:

| mov.q | [rbx + 8], r8 |
| mov.q | [rbx + 16], r9 |

In accordance with the store fusion method and system, the two store micro-operations would become:

| mov.o | [rbx + 8], r8 |
| stdatahi.q | r9 | where the first micro-operation is a 128 bit store micro-operation and the second micro-operation is a store data only micro-operation. As described herein, the control bit(s) passed from the ALU(s) to the STQ(s) indicates to the STQ(s) to put the data from the store data only micro-operation in the upper 64b of the STQ(s). This is an example of a positive displacement.

In another positive address direction illustrative example, the instructions may be a MOV dword [addr] instruction followed by a MOV dword [addr+4] instruction. In this instance, the first store micro-operation stores to a lower address than the second store micro-operation and the two 4 byte store micro-operations are fused into one 8 byte store micro-operation. In particular, the first store micro-operation does use an AGSQ or STQ queue entry or token and is converted to a store micro-operation with a data size of 64 bits. The store data micro-operation component of the second store micro-operation may have an opcode value (that is functionally similar to a mov) to indicate that it is fused LO store data. The second store micro-operation does not use an AGSQ or STQ queue entry or token and is converted to a store data only micro-operation. The store data only micro-operation may have an opcode value (that is functionally similar to a shift-left-immediate with an immediate value of 32) to indicate that it is fused HI store data.

In another illustrative example, a negative address direction may be used. For example, a PUSH32b instruction followed by another PUSH32b instruction or a MOV dword [addr] followed by a MOV dword [addr-4] instruction. In this instance, the second store micro-operation stores to a lower address than the first store micro-operation and the two 4 bytes store micro-operations are fused into one 8 byte store micro-operation. In particular, the first store micro-operation does not use an AGSQ or STQ queue entry or token and is converted to a store data only micro-operation. The store data only micro-operation may have an opcode value (that is functionally similar to a shift-left-immediate with an immediate value of 32) to indicate that it is fused HI store data. The second store micro-operation does use an AGSQ or STQ queue entry or token and is converted to a store micro-operation with a data size of 64 bits. The store data micro-operation component of the second store micro-operation may have an opcode value (that is functionally similar to a mov) to indicate that it is fused LO store data. In another example the instructions may be a PUSH64b instruction followed by another PUSH64b instruction or a MOV qword [addr] followed by a MOV qword [addr-8] instruction. This operates similarly except that the data size is doubled from 64 bits to 128 bits.

There are additional considerations or changes in pipeline processing with respect to store fusion. A retire unit, as shown as retire unit 208 in FIG. 2, does not signal a store-retire indication on the store data only operation.

Stores in the retire queue 208 normally have a "store" bit that is used by the retire hardware to indicate how many stores have retired (become non-speculative) in a cycle. Suppressing this store-retirement indication for the store data only operation in a fused store can be achieved by simply not setting the "store" bit in its retire queue entry.

Exception handling also changes for fused stores. It is possible that one of the stores should take an architectural or micro-architectural exception, such as a page fault or trap. However, with fused stores, the exception logic doesn't see the stores as independent operations since the exception logic can only detect an exception on the single fused store. The exception logic cannot determine which store architecturally should have taken the exception. This is handled by requiring that the fused store micro-operations are dispatched as an atomic group with an extra bit in the retire queue, for example retire queue 208, indicating a fused store operation. Should a fault or trap occur on the fused store operation, the exception is converted into a resync fault and the instructions are re-executed, and on this re-execution, the store fusion mechanism is temporarily disabled for one dispatch cycle so that they are dispatched without fusing. If the exception recurs, it will now be handled in a conventional manner.

There are additional considerations when implementing store fusion with memory renaming. Without taking these considerations into account, this can result in lost opportunities for memory renaming. For example, without store fusion, a load instruction that exactly matches an older store instruction to the same address would be able to be successfully memory-renamed to the older store. However, with store fusion, the older store may be fused as the HI part of a fused store. The load address would not exactly match the fused store's address, and the normal memory-renaming logic will cause the load to fail memory-renaming, resulting in the memory-renamed load taking a resync-fault, causing loss of performance. This is resolved in an implementation by having the fused store micro-operation act as if it were a real store for the purpose of memory renaming, but remembering that it was the HI part of a fused store using an additional HI store bit in the memory-renaming tracking structure (known as a memfile) for the store data HI micro-operation indicating that it is HI part of a fused store. When a load gets memory-renamed to a HI fused store, the memfile passes that HI store bit to the load with its memory renamed STQ ID information. The load uses the HI store bits on all of the stores in the memfile to adjust its renamed STQ ID to point to the correct store (since HI stores don't occupy a STQ entry). Additionally, when renaming is verified, the load's HI store bit is used to check that the load's address is equal to the store's address+load data size instead of exactly matching. This means that the load exactly matched the address of the upper half of the fused store, and so memory renaming was correct and successful.

Figure 2:
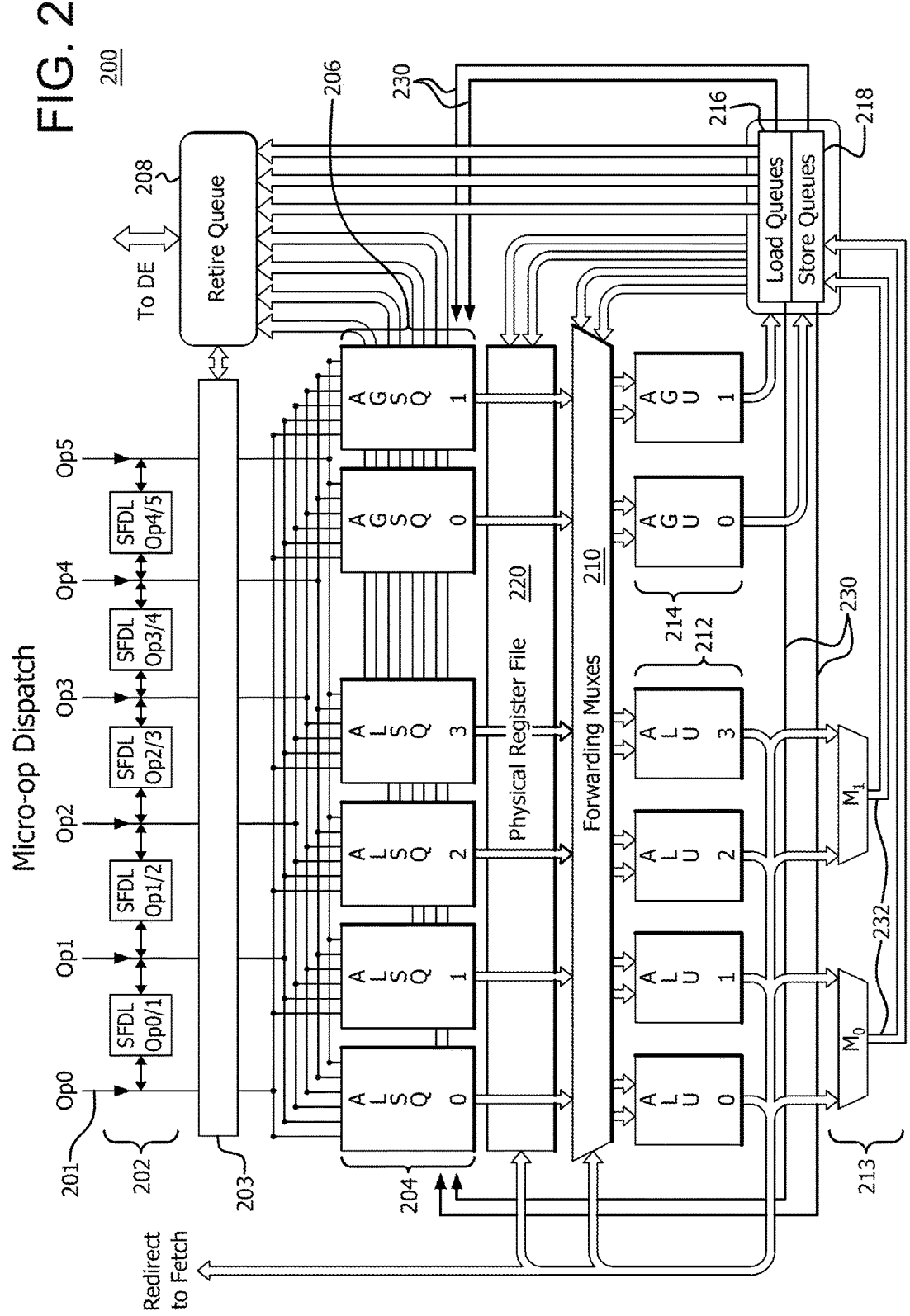
FIG. 2 is a high level block and flow diagram of an integer scheduler and/or execution unit in accordance with certain implementations.

FIG. 2 is a high level block diagram of the interfaces between dispatch logic 201, SFDL Op 0/1-SFDL Op 4/5 202 and an integer scheduler/execution unit 200 in accordance with certain implementations. In particular, micro-operations Op0-Op5 are dispatched via associated dispatch slots in a dispatch logic 201 to the integer scheduler/execution unit 200 and a SFDL Op 0/1-SFDL Op 4/5 202 is connected to the dispatch logic 201 to determine store fusion candidates.

The integer scheduler/execution unit 200 includes an integer renamer/mapper 203 which is connected to $ALSQ_0$-$ALSQ_3$ 204, $AGSQ_0$-$AGSQ_1$ 206 and a retire queue 208. The $ALSQ_0$-$ALSQ_3$ 204 and $AGSQ_0$-$AGSQ_1$ 206 are further connected to forwarding multiplexors 210, which in turn are connected to $ALU_0$-$ALU_3$ 212 and $AGU_0$-$AGU_1$ 214, respectively. The $ALU_0$-$ALU_3$ 212 are connected to STQs 218 via a pair of multiplexers $M_0$ and $M_1$ 213 and a store data interface 232. The $AGU_0$-$AGU_1$ 214 are connected to LDQs 216 and STQs 218 and retire queue 208. The integer scheduler/execution unit 200 also includes a physical file register 220 which is connected to $ALU_0$-$ALU_3$ 212, LDQs 216 and STQs 218. The LDQs 216 and STQs 218 are connected to $AGSQ_0$-$AGSQ_1$ 206 via path 230 to send deallocation signals and to retire queue 208.

Similar to FIG. 1, micro-operations are examined by the SFDL Op 0/1-SFDL Op 4/5 202 to determine whether adjacent micro-operations are consecutive store micro-operations. Adjacent micro-operations refers to micro-operations flowing through adjacent dispatch slots and consecutive store micro-operations refers to both of the adjacent micro-operations being store micro-operations. In particular, SFDL Op 0/1 determines a store fusion candidate from micro-operations 0 and 1, SFDL Op 1/2 determines a store fusion candidate from micro-operations 1 and 2, SFDL Op 2/3 determines a store fusion candidate from micro-operations 2 and 3, SFDL Op 3/4 determines a store fusion candidate from micro-operations 3 and 4, and SFDL Op 4/5 determines a store fusion candidate from micro-operations 4 and 5. Each of SFDL Op 0/1-SFDL Op 4/5 202 also confirms whether the consecutive store micro-operations have the same data size and are accessing consecutive addresses as described herein. The SFDL logic operates mostly in parallel, checking pairs of adjacent micro-operations independently for store fusion eligibility. However, priority is applied such that the oldest micro-operations are fused with higher priority. Furthermore, once a micro-operation is part of a fused store, that micro-operations is ineligible to participate in store fusion for the next-oldest SFDL block. For example, imagine three store micro-operations, dispatched in Op 0, Op 1, and Op 2, all to consecutive bytes (consecutive addresses). Both SFDL Op 0/1 and SFDL Op 1/2 would determine that their respective operations are able to be fused. SFDL Op 0/1 takes priority and fuses Op 0 and Op 1 into a fused store operation. Because Op 1 was part of an older fused store, it is ineligible to be fused with Op 2, so SFDL Op 1/2 is not allowed to fuse Op 1 and Op2 into a fused store operation.

Each of SFDL Op 0/1-SFDL Op 4/5 202 fuses the appropriate store micro-operations into a store micro-operation with two times the data size and a store data HI micro-operation where the load/store micro-operation and address generation micro-operation components are suppressed and only a queue entry in the $ALSQ_0$-$ALSQ_3$ 204 is needed. As stated herein, each SFDL Op 0/1-SFDL Op 4/5 202 sets a same STQ 218 queue entry number in both the store micro-operation with data size 2x and the store data HI micro-operation and sets the micro-operation type in the store data HI micro-operation to indicate that this data is the high part of the store micro-operation with data size 2x.

Once each SFDL Op 0/1-SFDL Op 4/5 202 has fused the consecutive store micro-operations as needed, the dispatch logic 201 dispatches the store micro-operation with data size 2x and the store data HI micro-operation to the $ALSQ_0$-$ALSQ_3$ 204 and $AGSQ_0$-$AGSQ_1$ 206, as appropriate. The $ALSQ_0$-$ALSQ_3$ 204 and $AGSQ_0$-$AGSQ_1$ 206 issue the store micro-operation with data size 2x and the store data HI micro-operation to $ALU_0$-$ALU_3$ 212. The $ALU_0$-$ALU_3$ 212 sends a control bit(s) via the store data interface 232 to the STQs 218 to indicate that the data in the store data HI micro-operation is to be written in the higher or upper part of the store data field. The STQs 218 perform the required writes.

Figure 3:
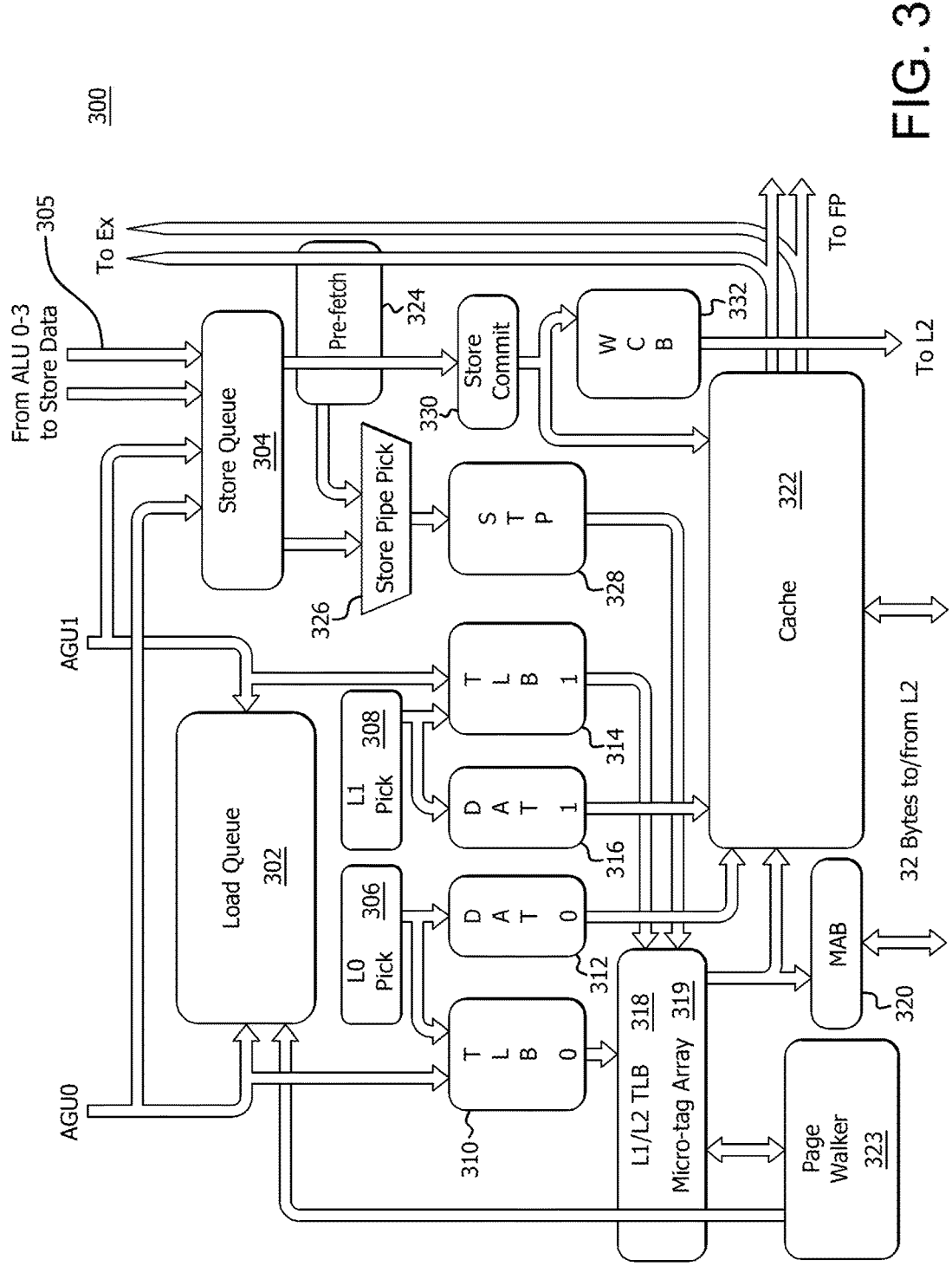
FIG. 3 is a high level block and flow diagram of a load-store/data cache (LSDC) unit in accordance with certain implementations.

FIG. 3 is a high level block and flow diagram of a load-store/data cache (LSDC) unit 300 in accordance with certain implementations and functions as described herein for FIGS. 1 and 2. The LSDC unit 300 includes a LDQ 302, a STQ 304, a load 0 (L0) picker 306 and a load 1 (L1) picker 308. The STQ 304 gets data from ALUs (not shown) along with control bit(s) via a store data interface 305 which indicates that the data in a store data HI micro-operation needs to be shifted when stored. The L0 picker 306 is connected to a translation lookaside buffer (TLB) and micro-tag access pipeline 0 (TLB0) 310 and a data cache access pipeline (data pipe 0) 312. The L1 picker 308 is connected to a translation lookaside buffer (TLB) and micro-tag access pipeline 1 (TLB1) 314 and a data cache access pipeline (data pipe 1) 316. The TLB0 310 and TLB1 314 are further connected to L1/L2 TLB 318, a page walker 323, and micro-tag array 319, which in turn is connected to a miss address buffer (MAB) 320, and assists in reading data from a cache 322. The data pipe 0 312 and data pipe 1 316 are connected to the cache 322. The STQ 304 is connected to a pre-fetcher 324 and a store pipe picker 326, which in turn is connected to a store pipeline (STP) 328. The STP 328 is also connected to the L1/L2 TLB 318 and the micro-tag array 319. The STQ 304 is further connected to a store commit pipeline 330, which in turn is connected to a write combining buffer (WCB) 332 and the cache 322.

Figure 4:
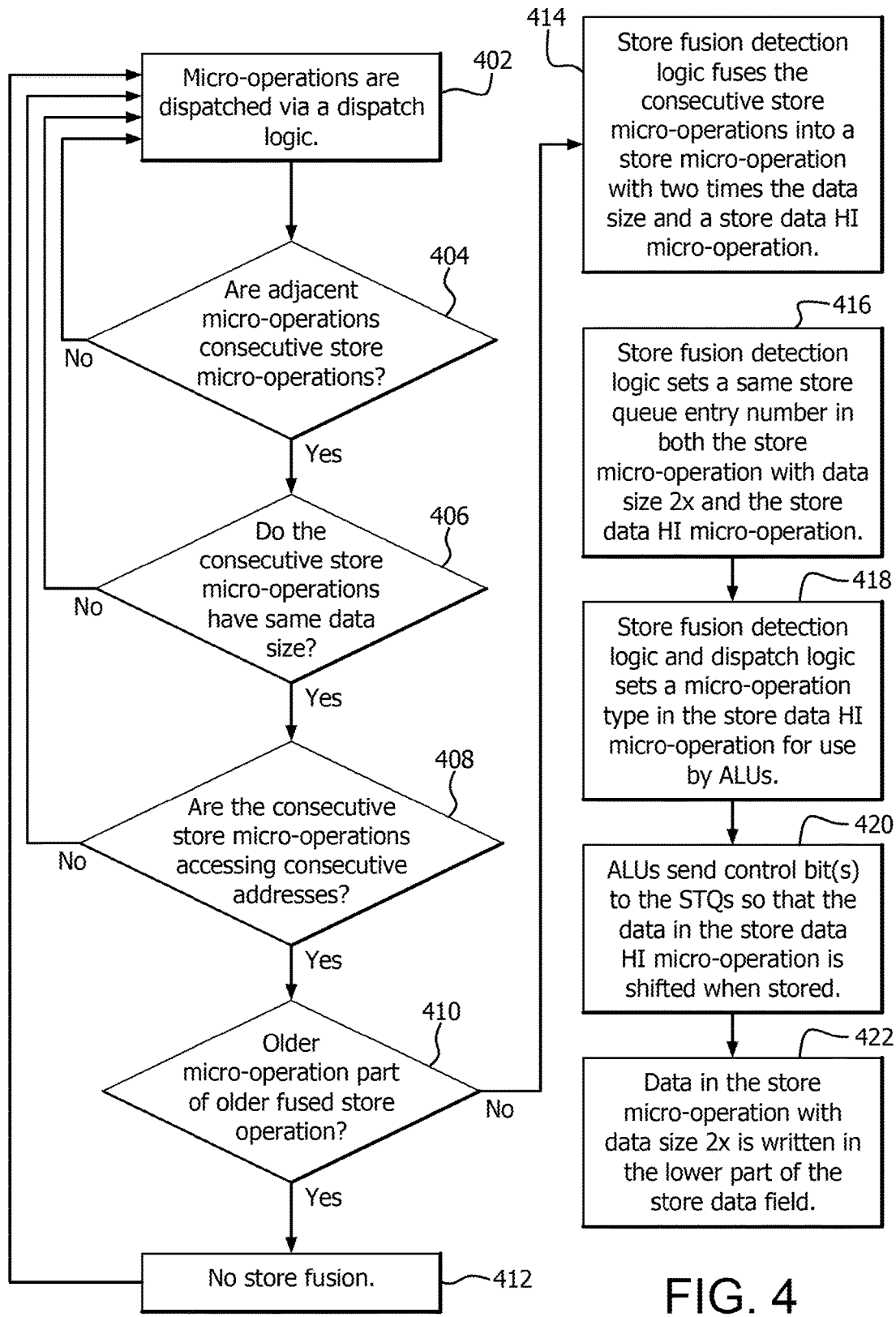
FIG. 4 is a flow diagram of a method for store fusion in accordance with certain implementations.

FIG. 4 is a flow diagram 400 of a method for store fusion in accordance with certain implementations. Micro-operations are dispatched via a dispatch logic (step 402). A store fusion detection logic detects whether adjacent micro-operations are consecutive store micro-operations (step 404). Adjacent micro-operations refers to micro-operations flowing through adjacent dispatch slots and the consecutive store micro-operations refers to both of the adjacent micro-operations being store micro-operations. If the adjacent micro-operations are not consecutive store micro-operations, then review the next set of dispatched micro-operations (step 402). If the adjacent micro-operations are consecutive store micro-operations, then the store fusion detection logic determines whether the consecutive store micro-operations have the same data size (step 406). If the consecutive store micro-operations are not the same size, then review the next set of dispatched micro-operations (step 402). If the consecutive store micro-operations are the same size, then the store fusion detection logic determines whether the consecutive store micro-operations are accessing consecutive addresses (step 408). If the consecutive store micro-operations are not accessing consecutive addresses, then review the next set of dispatched micro-operations (step 402). If the consecutive store micro-operations are accessing consecutive addresses, then the store fusion detection logic determines if an older micro-operation of the two micro-operations under consideration are part of an older fused store operation (step 410). If part of older store fusion, no store fusion is done (step 412) and review the next set of dispatched micro-operations (step 402). If not part of older fused store operation, the store fusion detection logic fuses the consecutive store micro-operations into a store micro-operation with two times the data size and a store data HI micro-operation (step 414).

The store fusion detection logic sets a same store queue entry number in both the store micro-operation with data size 2x and the store data HI micro-operation (step 416). The store fusion detection logic and dispatch logic sets a micro-operation type in the store data HI micro-operation to indicate to the ALUs that this data is the high part of the store micro-operation with data size 2x (step 418). ALUs send control bit(s) to the STQs so that the data in the store data HI micro-operation is shifted when stored (step 420). The data in the store micro-operation with data size 2x is written in the lower part of the store data field (step 422). The order of operations is illustrative only and other orders can be used.

Figure 5:
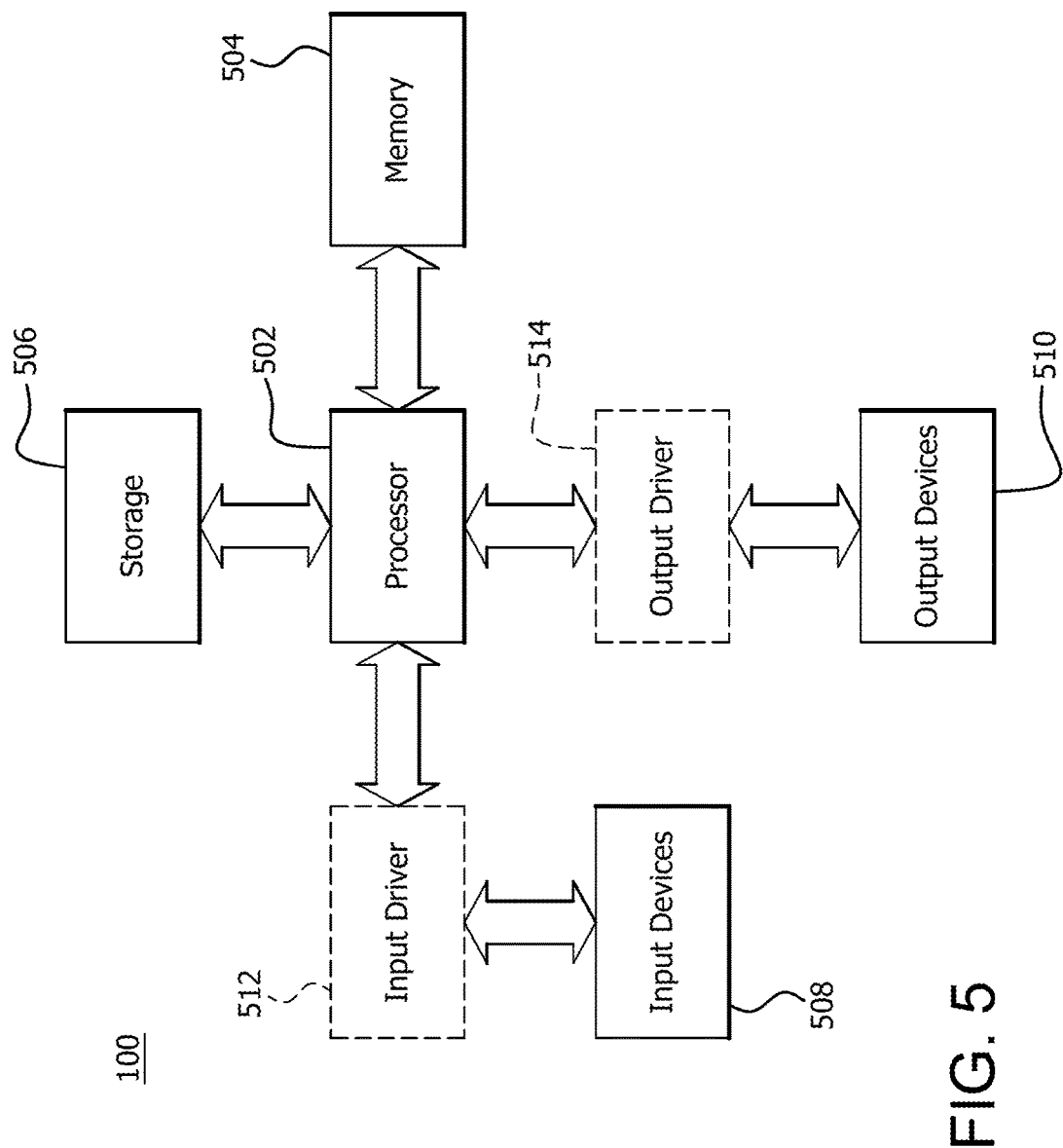
FIG. 5 is a block diagram of an example device in which one or more disclosed implementations may be implemented.

FIG. 5 is a block diagram of an example device 500 in which one or more portions of one or more disclosed examples are implemented. The device 500 includes, for example, a head mounted device, a server, a computer, a gaming device, a handheld device, a set-top box, a television, a mobile phone, or a tablet computer. The device 500 includes a compute node or processor 502, a memory 504, a storage 506, one or more input devices 508, and one or more output devices 510. The device 500 also optionally includes an input driver 512 and an output driver 514. It is understood that the device 500 includes additional components not shown in FIG. 5.

The compute node or processor 502 includes a central processing unit (CPU), a graphics processing unit (GPU), a CPU and GPU located on the same die, or one or more processor cores, wherein each processor core may be a CPU or a GPU. The memory 504 is located on the same die as the compute node or processor 502, or is located separately from the compute node or processor 502. In an implementation, the memory 504 includes a volatile or non-volatile memory, for example, random access memory (RAM), dynamic RAM, or a cache.

The storage 506 includes a fixed or removable storage, for example, a hard disk drive, a solid state drive, an optical disk, or a flash drive. The input devices 508 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 510 include a display, a speaker, a printer, a haptic feedback device, one or more lights, an antenna, or a network connection (e.g., a wireless local area network card for transmission and/or reception of wireless IEEE 802 signals).

The input driver 512 communicates with the compute node or processor 502 and the input devices 508, and permits the compute node or processor 502 to receive input from the input devices 508. The output driver 514 communicates with the compute node or processor 502 and the output devices 510, and permits the processor 502 to send output to the output devices 510. It is noted that the input driver 512 and the output driver 514 are optional components, and that the device 500 will operate in the same manner if the input driver 512 and the output driver 514 are not present.

In general, a method for fusing store micro-operations includes determining whether adjacent micro-operations are consecutive store micro-operations. The adjacent micro-operations refers to micro-operations flowing through adjacent dispatch slots and the consecutive store micro-operations refers to both of the adjacent micro-operations being store micro-operations. A determination is made as to whether the consecutive store micro-operations have same data size and are accessing consecutive addresses. The consecutive store micro-operations are fused into a store micro-operation with twice the data size and a store data only micro-operation. In an implementation, a same store queue entry number is set for the store micro-operation with twice the data size and the store data only micro-operation. In an implementation, a micro-operation type is set in the store data only micro-operation to indicate that data in the store data only micro-operation is an upper data part with respect to the store micro-operation with twice the data size. In an implementation, at least one control bit is sent to a store queue to facilitate shifting of the data when stored. In an implementation, the data in the store micro-operation with twice the data size is stored in a lower part of a store data field and data in the store data only micro-operation is stored in an upper part of the store data field. In an implementation, the store data only micro-operation suppresses use of store queue entries and address generation queue entries. In an implementation, an addressing mode of is reviewed of each of the consecutive micro-operations. In an implementation, the consecutive store micro-operation having a lower address is converted to the store micro-operation with twice the data size. In an implementation, the consecutive store micro-operation having a higher address is converted to the store data only micro-operation. In an implementation, a store-retire indication is suppressed with respect to the store data only micro-operation. In an implementation, an occurrence of an exception with respect to at least one of the store micro-operation with twice the data size and the store data only micro-operation results in re-execution of the adjacent micro-operations without fusing. In an implementation, a high store bit is set in a memory-renaming tracking structure for the store data only micro-operation and the high store bit is used to determine store queue entry.

In general, a processor for fusing store micro-operations includes a dispatch logic configured to dispatch micro-operations and a store fusion detection logic connected to the dispatch logic. The store fusion detection logic is configured to determine whether adjacent micro-operations are consecutive store micro-operations, wherein the adjacent micro-operations refers to micro-operations flowing through adjacent dispatch slots and the consecutive store micro-operations refers to both of the adjacent micro-operations being store micro-operations, determine whether the consecutive store micro-operations have same data size, determine whether the consecutive store micro-operations are accessing consecutive addresses and fuse the consecutive store micro-operations into a store micro-operation with twice the data size and a store data only micro-operation. In an implementation, the dispatch logic and the store fusion detection logic are configured to set a same store queue entry number for the store micro-operation with twice the data size and the store data only micro-operation. In an implementation, the dispatch logic and the store fusion detection logic are configured to set a micro-operation type in the store data only micro-operation to indicate that data in the store data only micro-operation is an upper data part with respect to the store micro-operation with twice the data size. In an implementation, the processor includes a store queue and an arithmetic logic unit in communication with the store queue. The arithmetic logic unit configured to send at least one control bit to the store queue to facilitate shifting of the data when stored. In an implementation, the data in the store micro-operation with twice the data size is stored in a lower part of a store data field and data in the store data only micro-operation is stored in an upper part of the store data field. In an implementation, the store data only micro-operation suppresses use of store queue entries and address generation queue entries. In an implementation, the consecutive store micro-operation having a lower address is converted to the store micro-operation with twice the data size and the consecutive store micro-operation having a higher address is converted to the store data only micro-operation. In an implementation, a store-retire indication is suppressed with respect to the store data only micro-operation and wherein an occurrence of an exception with respect to at least one of the store micro-operation with twice the data size and the store data only micro-operation results in re-execution of the adjacent micro-operations without fusing.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for fusing store micro-operations, the method comprising:

determining whether adjacent micro-operations are consecutive store micro-operations, wherein the micro-operations are adjacent micro-operations if they flow through adjacent dispatch slots and adjacent micro-operations are consecutive store micro-operations if both of the adjacent micro-operations are store micro-operations;

if the adjacent micro-operations are consecutive store micro-operations:

determining whether the consecutive store micro-operations have a same data size;

determining whether the consecutive store micro-operations are accessing consecutive addresses; and if the consecutive store micro-operations have the same data size and are accessing consecutive addresses, fusing the consecutive store micro-operations into a store micro-operation with twice the data size and a store data only micro-operation, wherein the store data only micro-operation suppresses a store queue and an address generation scheduler queue.

2. The method of claim 1, further comprising:
setting a same store queue entry number for the store micro-operation with twice the data size and the store data only micro-operation.

3. The method of claim 2, further comprising:
setting a micro-operation type in the store data only micro-operation to indicate that data in the store data only micro-operation is an upper data part with respect to the store micro-operation with twice the data size.

4. The method of claim 3, further comprising:
sending at least one control bit to the store queue to facilitate shifting of the data when stored.

5. The method of claim 1, wherein data in the store micro-operation with twice the data size is stored in a lower part of a store data field and data in the store data only micro-operation is stored in an upper part of the store data field.

6. The method of claim 1, further comprising:
reviewing an addressing mode of each the consecutive micro-operations.

7. The method of claim 1, wherein the consecutive store micro-operation having a lower address is converted to the store micro-operation with twice the data size.

8. The method of claim 7, wherein the consecutive store micro-operation having a higher address is converted to the store data only micro-operation.

9. The method of claim 1, wherein a store-retire indication is suppressed with respect to the store data only micro-operation.

10. The method of claim 1, wherein an occurrence of an exception with respect to at least one of the store micro-operation with twice the data size and the store data only micro-operation results in re-execution of the adjacent micro-operations without fusing.

11. The method of claim 1, further comprising:
setting a high store bit in a memory-renaming tracking structure for the store data only micro-operation; and
using the high store bit to determine store queue entry.

12. A processor for fusing store micro-operations, comprising:
a dispatch logic configured to dispatch micro-operations; and
a store fusion detection logic in communication with the dispatch logic, the store fusion detection logic configured to:
determine whether adjacent micro-operations are consecutive store micro-operations, wherein the micro-operations are adjacent micro-operations if they flow through adjacent dispatch slots and adjacent micro-operations are consecutive store micro-operations if both of the adjacent micro-operations are store micro-operations;
if the adjacent micro-operations are consecutive store micro-operations:
determine whether the consecutive store micro-operations have a same data size;
determine whether the consecutive store micro-operations are accessing consecutive addresses; and
if the consecutive store micro-operations have the same data size and are accessing consecutive addresses, fuse the consecutive store micro-operations into a store micro-operation with twice the data size and a store data only micro-operation, wherein the store data only micro-operation suppresses a store queue and an address generation scheduler queue.

13. The processor of claim 12, wherein the dispatch logic and the store fusion detection logic are configured to set a same store queue entry number for the store micro-operation with twice the data size and the store data only micro-operation.

14. The processor of claim 13, wherein the dispatch logic and the store fusion detection logic are configured to set a micro-operation type in the store data only micro-operation to indicate that data in the store data only micro-operation is an upper data part with respect to the store micro-operation with twice the data size.

15. The processor of claim 14, further comprising:
an arithmetic logic unit in communication with the store queue, the arithmetic logic unit configured to send at least one control bit to the store queue to facilitate shifting of the data when stored.

16. The processor of claim 12, wherein data in the store micro-operation with twice the data size is stored in a lower part of a store data field and data in the store data only micro-operation is stored in an upper part of the store data field.

17. The processor of claim 12, wherein the consecutive store micro-operation having a lower address is converted to the store micro-operation with twice the data size and the consecutive store micro-operation having a higher address is converted to the store data only micro-operation.

18. The processor of claim 12, wherein a store-retire indication is suppressed with respect to the store data only micro-operation and wherein an occurrence of an exception with respect to at least one of the store micro-operation with twice the data size and the store data only micro-operation results in re-execution of the adjacent micro-operations without fusing.

* * * * *